United States Patent
Yamaguchi et al.

(10) Patent No.: US 11,629,259 B2
(45) Date of Patent: Apr. 18, 2023

(54) ACTIVE ENERGY RAY CURABLE COMPOSITION, ACTIVE ENERGY RAY CURABLE INK COMPOSITION, ACTIVE ENERGY RAY CURABLE INKJET INK COMPOSITION, COMPOSITION CONTAINER, IMAGE FORMING DEVICE, IMAGE FORMING METHOD, CURED MATTER, AND DECORATED MATTER

(71) Applicant: RICOH COMPANY, LTD., Tokyo (JP)

(72) Inventors: Tatsuki Yamaguchi, Kanagawa (JP);
Soh Noguchi, Kanagawa (JP);
Mitsunobu Morita, Shizuoka (JP);
Takashi Okada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/126,409

(22) Filed: Dec. 18, 2020

(65) Prior Publication Data
US 2021/0189157 A1   Jun. 24, 2021

(30) Foreign Application Priority Data
Dec. 23, 2019 (JP) .............................. JP2019-231193

(51) Int. Cl.
| | | |
|---|---|---|
| C09D 11/10 | (2014.01) | |
| C09D 11/101 | (2014.01) | |
| C09D 11/38 | (2014.01) | |
| B41M 7/00 | (2006.01) | |
| B41M 5/00 | (2006.01) | |
| C08L 67/06 | (2006.01) | |

(52) U.S. Cl.
CPC ......... *C09D 11/101* (2013.01); *B41M 5/0023* (2013.01); *B41M 7/0081* (2013.01); *C08L 67/06* (2013.01); *C09D 11/38* (2013.01)

(58) Field of Classification Search
CPC ...... C09D 11/101; C09D 11/38; C08K 67/06; B41M 5/0023; B41M 7/0081
See application file for complete search history.

(56) References Cited

U.S. PATENT DOCUMENTS

| | | | |
|---|---|---|---|
| 10,883,014 B2* | 1/2021 | Jang | .................. C09D 4/00 |
| 2008/0145624 A1* | 6/2008 | Weikard | ............ C08G 18/8175 |
| | | | 264/447 |
| 2017/0008325 A1 | 1/2017 | Hiraoka et al. | |
| 2020/0010662 A1 | 1/2020 | Hiraoka et al. | |
| 2020/0031969 A1 | 1/2020 | Kobayashi et al. | |
| 2020/0032068 A1 | 1/2020 | Yamaguchi et al. | |
| 2020/0032089 A1 | 1/2020 | Kobayashi et al. | |
| 2020/0003831 A1 | 2/2020 | Takenori et al. | |
| 2020/0038309 A1 | 2/2020 | Suenaga et al. | |
| 2020/0299425 A1 | 9/2020 | Kobayashi et al. | |
| 2020/0308425 A1 | 10/2020 | Noguchi et al. | |

FOREIGN PATENT DOCUMENTS

| | | |
|---|---|---|
| JP | 2004-532350 | 10/2004 |
| JP | 2012-107118 | 6/2012 |
| JP | 2014-177551 | 9/2014 |
| JP | 2017-019989 | 1/2017 |
| WO | WO2003/000813 A1 | 1/2003 |

* cited by examiner

*Primary Examiner* — Sanza L. McClendon
(74) *Attorney, Agent, or Firm* — Grüneberg and Myers, PLLC

(57) ABSTRACT

An active energy ray curable composition contains an allophanate-bond-containing compound having an activatable group at exposure to active energy rays and a polyester resin having a polymerizable unsaturated bond.

10 Claims, 3 Drawing Sheets

ACTIVE ENERGY RAY CURABLE COMPOSITION, ACTIVE ENERGY RAY CURABLE INK COMPOSITION, ACTIVE ENERGY RAY CURABLE INKJET INK COMPOSITION, COMPOSITION CONTAINER, IMAGE FORMING DEVICE, IMAGE FORMING METHOD, CURED MATTER, AND DECORATED MATTER

CROSS-REFERENCE TO RELATED APPLICATIONS

This patent application is based on and claims priority pursuant to 35 U.S.C. § 119 to Japanese Patent Application No. 2019-231193, filed on Dec. 23, 2019, in the Japan Patent Office, the entire disclosure of which is hereby incorporated by reference herein.

BACKGROUND

Technical Field

The present disclosure relates to an active energy ray curable composition, an active energy ray curable ink composition, an active energy ray curable inkjet ink composition, composition container, an image forming device, an image forming method, cured matter, and decorated matter.

Description of the Related Art

Active energy ray curable compositions cure at exposure to active energy rays, dry faster than solvent-based ink compositions, and are required to adhere to inorganic-based substrates such as glass and metal.

SUMMARY

According to embodiments of the present disclosure, an active energy ray curable composition is provided which contains an allophanate-bond-containing compound having an activatable group at exposure to active energy rays and a polyester resin having a polymerizable unsaturated bond.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

Figure 1:
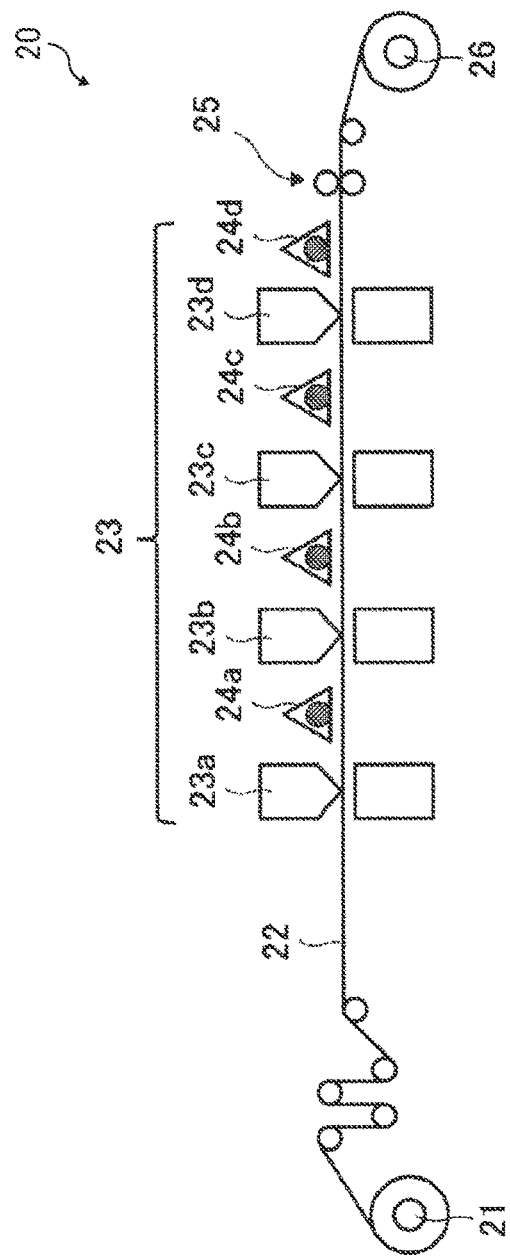
FIG. 1 is a schematic diagram illustrating an example of the image forming device according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to the present disclosure, an active energy ray curable composition is provided which is capable of striking a balance between the attachability to a substrate and the strength of film applied to the substrate and demonstrating excellent discharging stability when discharged in inkjetting.

Active Energy Ray Curable Composition

The active energy ray curable composition of the present disclosure contains an allophanate-bond-containing compound having an activatable group at exposure to active energy rays, a polyester resin having a polymerizable unsaturated bond, and other optional components.

Existing active energy ray curable compositions have a trade-off between the strength and attachability of applied film on a substrate. Resins can be added to the active energy ray curable composition to enhance the attachability. However, if such a resin has a large molecular weight, the discharging stability deteriorates in inkjetting.

Having investigated such drawbacks, the present inventors have formulated the active energy ray curable composition of the present disclosure containing an allophanate-bond-containing compound having an activatable group at exposure to active energy rays and a polyester resin having a polymerizable unsaturated bond, which can cancel the trade-off and demonstrate excellent discharging stability when discharged in inkjetting.

Allophanate-bond-containing Compound Having Activatable Group at Exposure to Active Energy Ray The allophanate-bond-containing compound of the present disclosure contains an activatable group at exposure to active energy rays. The compound polymerizes or crosslinks at exposure to active energy rays owing to the group activatable at exposure to active energy rays so that the active energy ray curable compound can form a strong film. This allophanate bond makes the active energy ray curable composition firmly attach to a substrate having a high polarity such as metal or glass.

The active energy ray curable composition is stably discharged in inkjetting because thickening attributable to a common urethane bond is reduced due to the hydrogen bond contained in the allophanate bond.

The group activatable at exposure to active energy rays preferably has an acryloyloxy group or methacryloyloxy group at terminal. Radical polymerizable compounds having radical polymerizable function groups of acryloyloxy groups or methacryloyloxy groups are also preferable.

The proportion of the allophanate-bond-containing compound having an activatable group at exposure to active energy rays in the total of the active energy ray curable composition is preferably from 4 to 10 percent by mass and more preferably from 4.8 to 8 percent by mass. A proportion of 4 percent by mass or more of the allophanate-bond-containing compound having an activatable group at exposure to active energy rays is preferable to form strong film. A proportion of 10 percent by mass or less is preferable to reduce contraction attributable to curing, thereby preventing degradation of attachability.

The allophanate-bond-containing compound having an activatable group at exposure to active energy rays can be synthesized or procured.

Specific examples of procured compound include, but are not limited to, EBECRYL 4666, EBECRYL 4738, and EBECRYL 4740 (all manufactured by DAICEL-ALLNEX LTD.).

The allophanate-bond-containing compound having an activatable group at exposure to active energy rays is identified from the allophanate-bond-containing compound with an analyzer that uses liquid chromatography-mass spectrometry (LC-MS), gas chromatography-mass spectrometry (GC-MS), or infrared spectroscopy (IR). It can be identified with an analyzer that uses GC-MS after decomposition with supercritical methanol from cured matter of the active energy ray curable composition.

Polyester Resin Having Polymerizable Unsaturated Bond

The active energy ray curable composition of the present disclosure contains a polyester having a polymerizable unsaturated bond. The polymerizable unsaturated bond in the polyester resin copolymerizes with a polymerizable compound, which is inferred to achieve strong attachability with a substrate.

The polyester resin having a polymerizable unsaturated bond of the present disclosure preferably has an unsaturated group not derived from (meth)acryloyl group. Examples of the unsaturated group other than (meta)acryloyl group include, but are not limited to, vinyl group and aryl group.

Specific examples include, but are not limited to, UVAD-081 and UVAD-085 (manufactured by OSAKA SODA CO., LTD.).

The number average molecular weight of the polyester resin having a polymerizable unsaturated bond is preferably 3,000 or less. A number average molecular weight of 3,000 or less prevents degradation of discharging stability in inkjetting. The lower limit of the number average molecular weight is, for example, about 500.

The number average molecular weight of the polyester resin is obtained by gel permeation chromatography (GPC) measuring, represented in standard polystyrene conversion.

The proportion of the polyester resin having a polymerizable unsaturated bond in the total amount of the active energy ray curable composition is preferably from 5 to 20 percent by mass and more preferably from 10 to 15 percent by mass. A proportion of the polyester resin at 5 percent by mass or more achieves sufficient attachability to a substrate. A proportion of the polyester resin at 20 percent by mass or less prevents degradation of discharging stability.

The polyester resin having a polymerizable unsaturated bond is identified from the active energy ray curable composition with an analyzer that uses LC-MS and GC-MS. It can be identified from cured matter of the active energy ray curable composition with an analyzer that uses GC-MS after decomposition with supercritical methanol.

The active energy ray curable composition of the present disclosure may furthermore optionally contain other polymerizable compound in addition to the allophanate-bond-containing compound and the polyester resin having a polymerizable unsaturated bond.

The polymerizable compound is preferably a monofunctional polymerizable monomer.

Specific examples of the monofunctional polymerizable monomer include, but are not limited to, phenoxyethyl (meth)acrylate, tetrahydrofurfuryl (meth)acrylate, isobornyl (meth)acrylate, 2-hydroxyethyl (meth)acrylate, 4-hydroxybutyl (meth)acrylate, isobutyl (meth)acrylate, t-butyl (meth)acrylate, isooctyl (meth)acrylate, 2-methoxyethyl (meth)acrylate, methoxytriethylene glycol (meth)acrylate, 2-ethoxyethyl (meth)acrylate, 3-methoxybutyl (meth)acrylate, ethoxyethyl (meth)acrylate, butoxyethyl (meth)acrylate, ethoxydiethylene glycol (meth)acrylate, methoxydixyl ethyl(meth)acrylate, ethyl diglycol (meth)acrylate, cyclic trimethylolpropane formal mono(meth)acrylate, imide (meth)acrylate, isoamyl (meth)acrylate, ethoxylated succinic acid (meth)acrylate, trifluoroethyl (meth)acrylate, ω-carboxypolycaprolactone mono(meth)acrylate, N-vinylformamide, cyclohexyl (meth)acrylate, benzyl (meth)acrylate, methylphenoxyethyl (meth)acrylate, 4-t-butylcyclohexyl (meth)acrylate, caprolactone-modified tetrahydrofurfuryl (meth)acrylate, tribromophenyl (meth)acrylate, ethoxylated tribromophenyl (meth)acrylate, 2-phenoxyethyl (meth)acrylate, (meth)acryloyl morpholine, phenoxydiethylene glycol (meth)acrylate, vinylcaprolactam, vinyl pyrrolidone, 2-hydroxy-3-phenoxypropyl (meth)acrylate, 1,4-cyclohexanedimethanol mono(meth)acrylate, 2-(2-ethoxyethoxy) ethyl (meth)acrylate, stearyl (meth)acrylate, diethylene glycol monobutyl ether (meth)acrylate,lauryl (meth)acrylate, isodecyl (meth)acrylate, 3,3,5-trimethylcyclohexanol (meth)acrylate, isooctyl (meth)acrylate, octyl/decyl (meth)acrylate, tridecyl (meth)acrylate, caprolactone (meth)acrylate, ethoxylated (4) nonylphenol (meth)acrylate, methoxypolyethylene glycol (350) mono(meth)acrylate, and methoxypolyethylene glycol (550) mono(meth)acrylate. These can be used alone or in combination. Of these, mono-functional polymerizable monomers having cyclic structures are preferable and tetrahydro furfuryl (meth) acrylate and isoboronyl (meth)acrylate are more preferable.

The proportion of the polymerizable monomer in the active energy ray curable composition is preferably from 40 to 80 percent by mass and more preferably from 60 to 76 percent by mass. A proportion of the polymerizable monomer at 40 percent by mass or more enhances attachability to a substrate. A proportion at 80 percent by mass or less improves pencil hardness.

Active Energy Ray

The active energy for use in curing the active energy ray curable composition of the present disclosure is not particularly limited as long as it can apply energy required to proceed the polymerization reaction of the polymerizable composition in the active energy ray curable composition.

Specific examples include, but are not limited to, electron beams, α rays, β rays, γ rays, and X rays, in addition to ultraviolet radiation. A particularly high energy light source obviates the need for a polymerization initiator to proceed polymerization reaction. In addition, in the case of irradiation of ultraviolet radiation, there is strong demand for mercury-free procedure to protect the environment. Therefore, superstition with GaN-based ultraviolet light-emitting devices is greatly preferred from industrial and environmental point of view. Furthermore, ultraviolet light-emitting diodes (UV-LED) and ultraviolet laser diodes (UV-LD) are preferable as ultraviolet light sources because they are small, inexpensive, and highly efficient, and have long working life.

Polymerization Initiator

The active energy ray curable composition of the present disclosure may contain a polymerization initiator. The polymerization initiator produces active species such as a radical or a cation upon an application of energy of active energy and initiates polymerization of a polymerizable compound (monomer or oligomer). As the polymerization initiator, it is suitable to use a known radical polymerization initiator, a cation polymerization initiator, a base producing agent, or a combination thereof. Of these, radical polymerization initiators are preferable. Moreover, the proportion of the polymerization initiator in the total amount of the active energy ray curable composition is from 5 to 20 percent by mass to achieve sufficient curing speed.

Specific examples of the radical polymerization initiators include, but are not limited to, aromatic ketones, acylphosphineoxide compounds, aromatic oniumchlorides, organic peroxides, thio compounds (thioxanthone compounds, compounds including thiophenyl groups, etc.), hexaarylbiimidazole compounds, ketoxime-esterified compounds, borate compounds, azinium compounds, metallocene compounds, active ester compounds, compounds having a carbon halogen bond, and alkylamine compounds.

In addition, a polymerization accelerator (sensitizer) can be optionally used together with the polymerization initiator. The polymerization accelerator is not particularly limited. Preferred examples thereof include, but are not limited to, amines such as trimethylamine, methyldimethanolamine, triethanolamine, p-diethylaminoacetophenone, p-dimethylaminoethylbenzoate, p-dimethyl aminobenzoate-2-ethylhexyl, N,N-dimthylbenzylamine and 4,4'-bis(diethylamino) benzophenone. The content of the polymerization accelerator is suitably determined to a particular application depending on the identification of the polymerization initiator and the amount of polymerization initiator used in combination with the polymerization accelerator.

Coloring Material

The active energy ray curable composition of the present disclosure may contain a coloring material. Pigments and dyes, which demonstrate black, white, magenta, cyan, yellow, green, orange, and gloss color such as gold and silver, can be used as the coloring material in accordance with the objectives and requisites of the composition of the present disclosure. The proportion of the coloring material is not particularly limited and can be suitably determined considering the desired color density and dispersibility in the composition. It is preferably from 0.1 to 20 percent by mass. Incidentally, the active energy ray curable composition of the present disclosure does not necessarily contain a coloring agent but can be clear and colorless.

If no coloring agent is present in a curable composition, the composition is suitable as an overcoat layer to protect an image.

An inorganic or organic pigment can be used alone or in combination as the pigment.

Specific examples of the inorganic pigment include, but are not limited to, carbon blacks (C.I. PIGMENT BLACK 7) such as furnace black, lamp black, acetylene black, and channel black, iron oxides, and titanium oxides.

Specific examples of the organic pigments include, but are not limited to, azo pigments such as insoluble azo pigments, condensed azo pigments, azo lakes, and chelate azo pigments, polycyclic pigments such as phthalocyanine pigments, perylene pigments, perinone pigments, anthraquinone pigments, quinacridone pigments, dioxane pigments, thioindigo pigments, isoindolinone pigments, and quinofuranone pigments, dye chelates such as basic dye type chelates and acid dye type chelates, dye lakes such as basic dye type lake and acid dye type lake, nitro pigments, nitroso pigments, aniline black, and daylight fluorescent pigments.

In addition, the coloring material may furthermore optionally contain a dispersant to enhance the dispersibility of the pigment. The dispersant has no particular limit. For example, it is suitable to use a polymer dispersant conventionally used to prepare a pigment dispersion.

The dye includes, for example, an acidic dye, direct dye, reactive dye, basic dye, and a combination thereof.

Organic Solvent

The active energy ray curable composition of the present disclosure optionally contains an organic solvent although it is preferable to spare it. The composition free of an organic solvent, in particular a volatile organic compound (VOC), is preferable because it enhances safeness at which the composition is handled so that pollution of the environment can be prevented. The organic solvent represents a non-reactive organic solvent such as ether, ketone, xylene, ethylacetate, cyclohexanone, or toluene, which is clearly distinguished from a reactive monomer. Furthermore, "free of" an organic solvent means that no organic solvent is substantially included. The proportion thereof is preferably less than 0.1 percent by mass.

Other Components

The active energy ray curable composition of the present disclosure may optionally contain other known components. The other known components are not particularly limited.

Examples are known additives such as surfactants, polymerization inhibitors, leveling agents, defoaming agents, fluorescent brighteners, penetration-enhancing agents, wetting agents (humectants), fixing agents, viscosity stabilizers, fungicide, preservatives, antioxidants, ultraviolet absorbents, chelate agents, pH regulators, and thickeners.

Preparation of Active Energy Ray Curable Composition

The active energy ray curable composition of the present disclosure can be prepared by using the components described above. The preparation devices and conditions are not particularly limited.

For example, an allophanate-bond-containing compound, a polyester resin having a polymerizable unsaturated bond, a polymerizable monomer, a pigment, and a dispersant are charged and dispersed in a dispersing machine such as a ball mill, kitty mill, a disk mill, a pin mill, and a DYNO-MILL to prepare a pigment liquid dispersion followed by mixing with a polymerizable monomer, an initiator, a polymerization inhibitor, and a surfactant.

Viscosity

The viscosity of the active energy ray curable composition of the present disclosure is not particularly limited and it can be adjusted to suit to a particular application and device. For example, if a discharging device that discharges the composition from nozzles is used, the viscosity thereof is preferably in the range of from 3 to 40 mPa•s, more preferably from 5 to 15 mPa•s, and particularly preferably from 6 to 12 mPa•s in the temperature range of from 20 to 65 degrees C., preferably at 25 degrees C.

In addition, it is particularly preferable to satisfy this viscosity range without containing the organic solvent mentioned above. Viscosity can be measured by a cone-and-plate type rotary viscometer (VISCOMETER TVE-22L, manufactured by TOKI SANGYO CO., LTD.) using a cone rotor (1°34'×R24) at a rotational frequency of 50 rpm with a setting of the temperature of hemathermal circulating water in a range of from 20 to 65 degrees C. VISCOMATE VM-150III can be used for the temperature control of the circulating water.

Application Field

The application field of the active energy ray curable composition of the present disclosure is not particularly limited. It can be applied to any field where the active energy ray curable composition is used. For example, the curable composition is selected suit to a particular application and used for a resin for use in molding, a paint, an adhesive, an insulant, a releasing agent, a coating material, a sealing material, resists, and optical materials.

Figure 2:
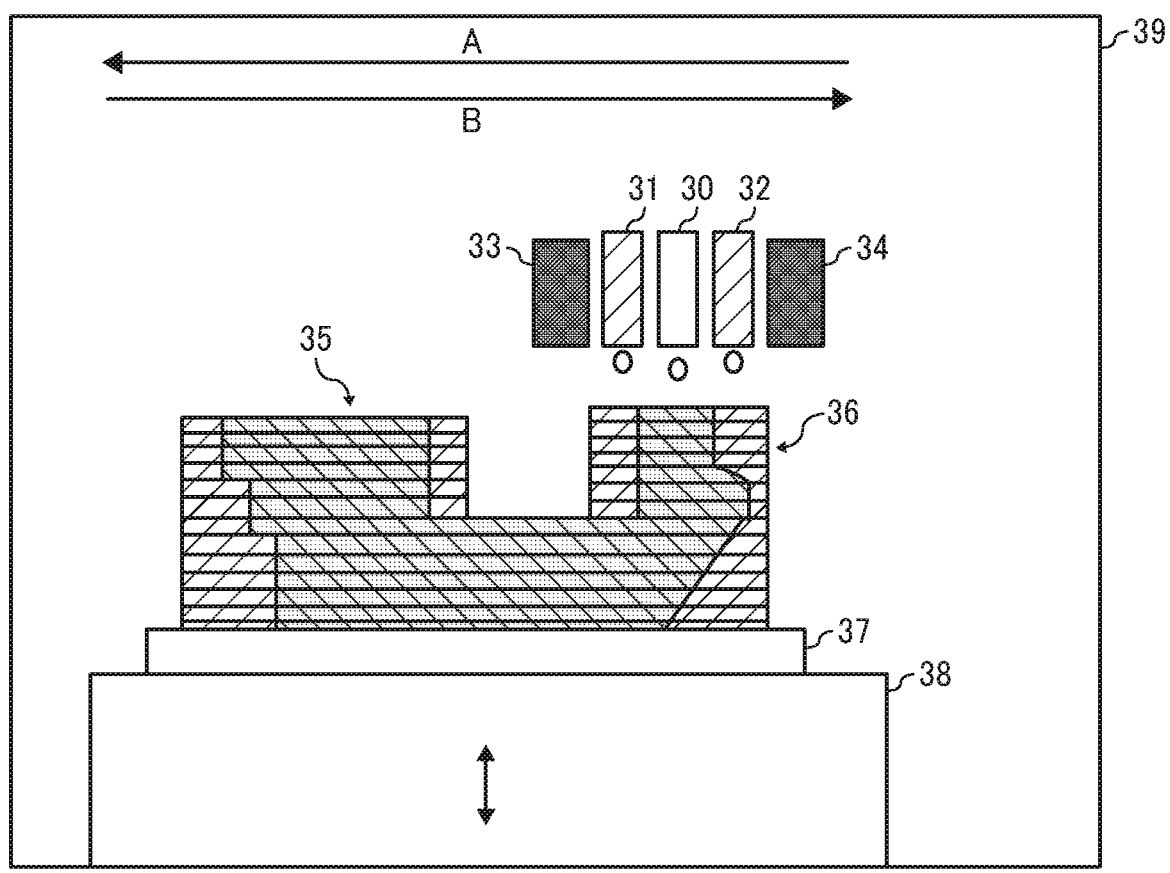
FIG. 2 is a schematic diagram illustrating another example of the image forming device according to an embodiment of the present disclosure.

Furthermore, the active energy ray curable composition of the present disclosure can be used as an ink to form two-dimensional texts, images, and designed coating film on various substrates and in addition as a solid object forming material to form a three-dimensional object. This material for a solid freeform fabrication can be used as a binder for powder particles for use in powder additive manufacturing to conduct solid freeform fabrication by repeating curing and laminating powder layers. Also, it can be used as a solid constituting material (modeling material) or supporting member (supporting material) for use in stereolithography as illustrated in FIG. 2 and FIGS. 3A to 3D. FIG. 2 is a diagram illustrating a method of discharging the active energy ray curable composition of the present disclosure to a particular region followed by curing upon irradiation of active energy rays to form a layer and laminating the layers (detail of which is described later).

Figure 3A:
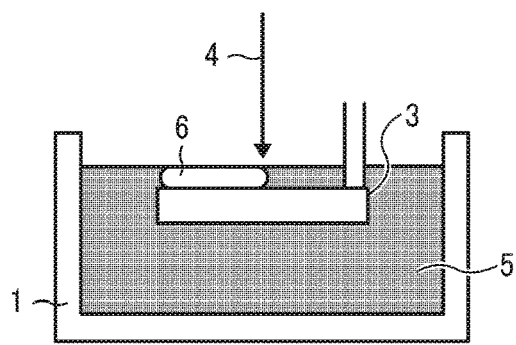
FIG. 3A is a schematic diagram illustrating another example of the image forming device according to an embodiment of the present disclosure.
Figure 3B:
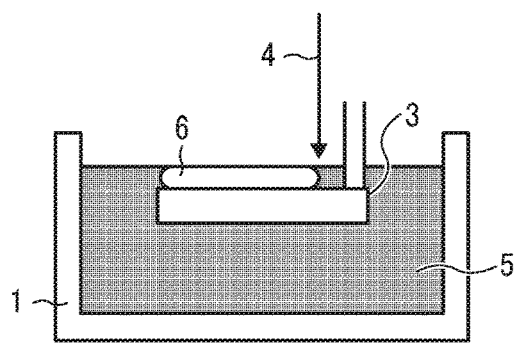
FIG. 3B is a schematic diagram illustrating another example of the image forming device according to an embodiment of the present disclosure.
Figure 3C:
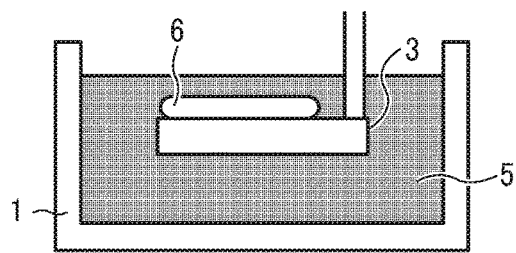
FIG. 3C is a schematic diagram illustrating another example of the image forming device according to an embodiment of the present disclosure.
Figure 3D:
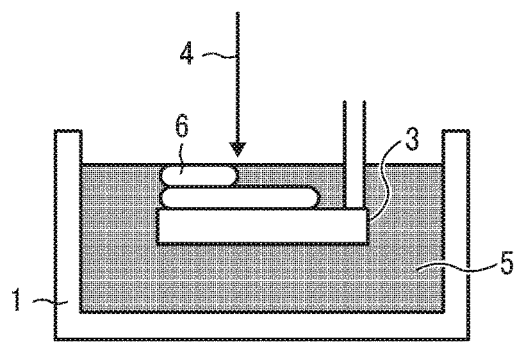
FIG. 3D is a schematic diagram illustrating another example of the image forming device according to an embodiment of the present disclosure.

FIGS. 3A to 3D are diagrams illustrating a method of irradiating a pool (accommodating unit) 1 of the active energy ray curable composition 5 of the present disclosure with active energy ray 4 to form a cured layer 6 having a particular form on a movable stage 3 and sequentially laminating the cured layer 6 so that a solid freeform fabrication object is obtained. In FIG. 3A, the pool (accommodating unit) 1 of the active energy ray curable composition 5 of the present disclosure is exposed to the active energy ray 4. In FIG. 3B, the cured layer 6 having a particular form is formed on the movable stage 3 owing to the exposure to the active energy ray 4. In FIG. 3C, the movable stage 3 is lowered. In FIG. 3D, another cured layer 6 is formed on the formed cured layer 6 owing to the exposure to the active energy ray 4.

It is possible to fabricate solid freeform fabrication objects using the active energy ray curable composition of the present disclosure with a known device without any particular limitation.

Such a device includes an accommodating unit, a supplying device, and a discharging device, and an active energy ray irradiator of the curable composition.

In addition, the present disclosure includes cured matter obtained by causing the active energy ray curable composition to cure and a mold product obtained by processing a structure of the cured matter formed on the substrate. The cured matter or structure having a sheet-like form or film-like form is subjected to molding process such as hot drawing and punching to obtain such a processed product. The processed product is preferably used for, for example, gauges or operation panels of vehicles, office machines, electric and electronic machines, and cameras, which requires surface-processing after decorating the surface.

The substrate is not particularly limited. It can be suitably selected to suit to a particular application. Substances such as paper, fiber, threads, fabrics, leather, metal, plastic, glass, wood, ceramics, or composite materials thereof can be used. Of these, plastic substrates are preferred in terms of processability.

Composition Container

The composition container of the present disclosure includes a container containing the active energy ray curable composition and is suitable for the applications as described above. If the active energy ray curable composition of the present disclosure is used for ink, the container containing the ink can be used as an ink cartridge or an ink bottle. Therefore, users can avoid direct contact with the ink during operations such as transfer or replacement of the ink, so that the users can keep the fingers and clothes clean. Furthermore, it is possible to prevent the ink from being contaminated with foreign matter such as dust. The container can be of any size, any form, and any material. For example, the container can be designed to a particular application. It is preferable that the container be made of a light blocking material to block the light or covered with materials such as a light blocking sheet.

Image Forming Method and Image Forming Device

The image forming method of the present disclosure may utilize active energy, heating, and others.

The image forming method of the present disclosure includes exposing the active energy ray curable composition of the present disclosure to active energy rays to cure the active energy ray curable composition. The image forming device for forming two or three dimensional images of the present disclosure includes an irradiator to expose the active energy ray curable composition of the present disclosure to active energy rays and an accommodating unit containing the curable composition of the present disclosure. The accommodating unit may include the composition container mentioned above. Furthermore, the method and the device may respectively include a discharging the active energy ray curable composition and a discharging device to discharge the active energy ray curable composition. The method of discharging the curable composition is not particularly limited. Two ways of examples are a continuous spraying method and an on-demand method. The on-demand method includes methods such as a piezo method, a thermal method, and an electrostatic method.

FIG. 1 is a diagram illustrating an example of the image forming device 20 including an inkjet discharging device. Printing units 23a, 23b, 23c, and 23d respectively having ink cartridges and discharging heads for yellow, magenta, cyan, and black active energy ray curable inks discharge the inks onto a recording medium 22 fed from a supplying roll 21. Thereafter, light sources (irradiators) 24a, 24b, 24c, and 24d emit active energy rays to the inks to cure, thereby forming a color image. Thereafter, a recording medium 22 is conveyed to a processing unit 25 and a printed matter reeling roll 26. Each of the printing unit 23a, 23b, 23c, and 23d may include a heating assembly to liquidize the ink at the ink discharging unit. Moreover, a mechanism may be optionally disposed which cools down the recording medium to an ambient temperature in a contact or non-contact manner. In addition, the inkjet recording method may be either of a serial method of discharging an ink onto a recording medium by moving the head while the recording medium intermittently moves in accordance with the width of a discharging head or a line method of discharging an ink onto a recording medium from a discharging head fixed at a particular position while continuously moving the recording medium.

The recording medium 22 is not particularly limited.

Specific examples include, but are not limited to, paper, film, ceramics, glass, metal, or complex materials thereof. The recording medium 22 may take a sheet-like form. The image forming device may have a simplex printing configuration capable of printing on one side of a recording medium or a duplex printing configuration capable of printing on both sides thereof. The recording medium is not limited to articles used as typical recording media. It is suitable to use corrugated cardboard, building materials such as wall paper and floor material, cloth for apparel such as T-shirts, textile, and leather as the recording media.

Optionally, it is possible to print an image with multiple colors with no or faint active energy from the light sources 24a, 24b, and 24c and thereafter expose the image to the active energy from the light source 24d. This configuration saves energy and cost.

The recorded matter having images printed with the active energy ray curable composition of the present invention includes items having printed text or images on a plain surface of a medium such as conventional paper and resin film, items having printed text or images on a rough surface, and items having printed text or images on a surface made of various materials such as metal or ceramic. In addition, it is possible to form an image partially with solid feeling (images with two dimension and three dimension) or a solid object by laminating two dimensional images.

FIG. 2 is a schematic diagram illustrating another example of the image forming device for fabricating three-dimensional objects of the present disclosure. An image forming device 39 illustrated in FIG. 2 stacks layers by: discharging the first active energy ray curable composition from a discharging head unit 30 for fabrication and a second active energy ray curable composition composed of different ingredients from the first active energy ray curable composition from discharging head units 31 and 32 for a support by using a head unit having inkjet heads disposed movable in the directions indicated by the arrows A and B; curing each composition with ultraviolet irradiators 33 and 34 disposed adjacent to the discharging head units 31 and 32; and repeating the discharging and the curing processes. More specifically, for example, after the discharging head units 31 and 32 for a support discharge the second active energy ray curable composition onto a substrate 37 for fabrication, the second active energy ray curable composition is solidified at exposure to active energy rays to form a first support layer having a hollow space (pool) for fabrication, and the discharging head unit 30 for fabrication discharges the first active energy ray curable composition onto the hollow space followed by exposure to active energy rays for solidification, thereby to form a first fabrication layer. This step is repeated multiple times in accordance with the required number of lamination while moving the stage 38 up and down in the vertical direction to laminate the support layer and the fabrication layer to manufacture a solid free-form fabrication object 35. Thereafter, a laminated support 36 is removed, if desired. Although there is only one discharging head unit 30 for fabrication in FIG. 2, the device may have two or more discharging head units 30.

Active Energy Ray Curable Ink Composition and Active Energy Ray Curable Inkjet

Ink Composition

The active energy ray curable composition of the present disclosure strikes a balance between the attachability to a substrate and the strength of film and has excellent discharging stability by inkjetting; therefore, the composition is suitably used as an active energy ray curable ink composition, in particular an active energy ray curable inkjet ink composition.

Cured Matter

The cured matter of the present disclosure is formed by exposing at least one of the active energy ray curable composition of the present disclosure, the active energy ray curable ink composition of the present disclosure, and the active energy ray curable composition for inkjetting of the present disclosure to active energy rays.

Decorated Matter

The decorated matter of the present disclosure has a substrate and a surface decoration formed of cured matter on the substrate. The cured matter can be the same as mentioned above.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present disclosure is described in detail with reference to Examples but is not limited thereto.

Examples 1 to 19 and Comparative Examples 1 to 10

Preparation of Active Energy Ray Curable Composition

According to the materials and the proportion in percent by mass shown in Tables 1 to 6, active energy ray curable compositions of Examples and Comparative Examples were prepared by a usual method.

TABLE 1

|  |  | Example 1 | Example 2 | Example 3 | Example 4 | Example 5 |
|---|---|---|---|---|---|---|
| All ophanate-bond-containing compound having activatable group at exposure to active energy ray | EBECRYL 4666 | 4.8 |  |  | 4.0 |  |
|  | EBECRYL 4738 |  | 4.8 |  |  | 4.0 |
|  | EBECRYL 4740 |  |  | 4.8 |  |  |
| Polyester resin having polymerizable unsaturated bond | UVAD-081 UVAD-085 | 12.0 | 12.0 | 12.0 | 12.0 | 12.0 |
| Polyester resin not having polymerizable unsaturated bond | VYLON 802 VYLON GK810 VYLON 885 |  |  |  |  |  |
| Polymerizable monomer | THFA | 51.2 | 51.2 | 51.2 | 52.0 | 52.0 |
|  | IBXA | 24 | 24 | 24 | 24 | 24 |
| Polymerizable oligomer | CN959 |  |  |  |  |  |
| Polymerization initiator | Omnirad TPO | 7.9 | 7.9 | 7.9 | 7.9 | 7.9 |
| Polymerization inhibitor | BHT | 0.1 | 0.1 | 0.1 | 0.1 | 0.1 |
|  | Total (Percent by mass) | 100.0 | 100.0 | 100.0 | 100.0 | 100.0 |
| Evaluation result | Pencil hardness | HB | B | B | B | B |
|  | Attachability Glass slide | S | S | S | S | S |
|  | Stainless plate | S | A | A | A | B |
|  | Polypropylene film | A | A | A | A | A |
|  | Discharging stability | A | A | A | A | A |

TABLE 2

|  |  | Example 6 | Example 7 | Example 8 | Example 9 | Example 10 |
|---|---|---|---|---|---|---|
| All ophanate-bond-containing compound having activatable group at exposure to active energy ray | EBECRYL 4666 |  | 10.0 |  |  | 10.0 |
|  | EBECRYL 4738 |  |  | 10.0 |  |  |
|  | EBECRYL 4740 | 4.0 |  |  | 10.0 |  |
| Polyester resin having polymerizable unsaturated bond | UVAD-081 UVAD-085 | 12.0 | 12.0 | 12.0 | 12.0 | 12.0 |
| Polyester resin not having polymerizable unsaturated bond | VYLON 802 VYLON GK810 VYLON 885 |  |  |  |  |  |
| Polymerizable monomer | THFA | 52.0 | 46.0 | 46.0 | 46.0 | 46.0 |
|  | IBXA | 24.0 | 24.0 | 24.0 | 24.0 | 24.0 |
| Polymerizable oligomer | CN959 |  |  |  |  |  |
| Polymerization initiator | Omnirad TPO | 7.9 | 7.9 | 7.9 | 7.9 | 7.9 |

TABLE 2-continued

|  |  | Example 6 | Example 7 | Example 8 | Example 9 | Example 10 |
|---|---|---|---|---|---|---|
| Polymerization inhibitor | BHT | 0.1 | 0.1 | 0.1 | 0.1 | 0.1 |
| Total (Percent by mass) | | 100.0 | 100.0 | 100.0 | 100.0 | 100.0 |
| Evaluation result | Pencil hardness | B | F | HB | HB | F |
| | Attachability  Glass slide | S | S | S | S | S |
| | Stainless plate | B | A | B | B | A |
| | Polypropylene film | A | A | A | A | A |
| | Discharging stability | A | A | A | A | A |

TABLE 3

|  |  | Example 11 | Example 12 | Example 13 | Example 14 | Example 15 |
|---|---|---|---|---|---|---|
| All ophanate-bond-containing compound having activatable group at exposure to active energy ray | EBECRYL 4666 | | | 4.8 | | |
| | EBECRYL 4738 | 10.0 | | | 4.8 | |
| | EBECRYL 4740 | | 10.0 | | | 4.8 |
| Polyester resin having polymerizable unsaturated bond | UVAD-081 | 12.0 | 12.0 | | | |
| | UVAD-085 | | | 12.0 | 12.0 | 12.0 |
| Polyester resin not having polymerizable unsaturated bond | VYLON 802 | | | | | |
| | VYLON GK810 | | | | | |
| | VYLON 885 | | | | | |
| Polymerizable monomer | THFA | 46.0 | 46.0 | 51.2 | 51.2 | 51.2 |
| | IBXA | 24.0 | 24.0 | 24.0 | 24.0 | 24.0 |
| Polymerizable oligomer | CN959 | | | | | |
| Polymerization initiator | Omnirad TPO | 7.9 | 7.9 | 7.9 | 7.9 | 7.9 |
| Polymerization inhibitor | BHT | 0.1 | 0.1 | 0.1 | 0.1 | 0.1 |
| Total (Percent by mass) | | 100.0 | 100.0 | 100.0 | 100.0 | 100.0 |
| Evaluation result | Pencil hardness | HB | HB | HB | B | B |
| | Attachability  Glass slide | S | S | S | S | S |
| | Stainless plate | B | B | S | A | A |
| | Polypropylene film | A | A | A | A | A |
| | Discharging stability | A | A | A | A | A |

TABLE 4

|  |  | Example 16 | Example 17 | Example 18 | Example 19 |
|---|---|---|---|---|---|
| All ophanate-bond-containing compound having activatable group at exposure to active energy ray | EBECRYL 4666 | 4.8 | 4.8 | 4.8 | 4.8 |
| | EBECRYL 4738 | | | | |
| | EBECRYL 4740 | | | | |
| Polyester resin having polymerizable unsaturated bond | UVAD-081 | | | | |
| | UVAD-085 | 5.0 | 20.0 | 10.0 | 15.0 |
| Polyester resin not having polymerizable unsaturated bond | VYLON 802 | | | | |
| | VYLON GK810 | | | | |
| | VYLON 885 | | | | |
| Polymerizable monomer | THFA | 58.2 | 43.2 | 53.2 | 48.2 |
| | IBXA | 24.0 | 24.0 | 24.0 | 24.0 |
| Polymerizable oligomer | CN959 | | | | |
| Polymerization initiator | Omnirad TPO | 7.9 | 7.9 | 7.9 | 7.9 |

TABLE 4-continued

|  |  | Example 16 | Example 17 | Example 18 | Example 19 |
|---|---|---|---|---|---|
| Polymerization inhibitor | BHT | 0.1 | 0.1 | 0.1 | 0.1 |
|  | Total (Percent by mass) | 100.0 | 100.0 | 100.0 | 100.0 |
| Evaluation result | Pencil hardness | B | HB | HB | HB |
| Attachability | Glass slide | A | S | A | S |
|  | Stainless plate | A | S | S | S |
|  | Polypropylene film | A | A | A | A |
|  | Discharging stability | A | B | A | A |

TABLE 5

|  |  | Comparative Example 1 | Comparative Example 2 | Comparative Example 3 | Comparative Example 4 | Comparative Example 5 |
|---|---|---|---|---|---|---|
| All ophanate-bond-containing compound having activatable group at exposure to active energy ray | EBECRYL 4666 | 4.8 |  |  |  |  |
|  | EBECRYL 4738 |  | 4.8 |  |  |  |
|  | EBECRYL 4740 |  |  | 4.8 |  |  |
| Polyester resin having polymerizable unsaturated bond | UVAD-081 |  |  |  | 12.0 | 12.0 |
|  | UVAD-085 |  |  |  |  |  |
| Polyester resin not having polymerizable unsaturated bond | VYLON 802 |  |  |  |  |  |
|  | VYLON GK810 |  |  |  |  |  |
|  | VYLON 885 |  |  |  |  |  |
| Polymerizable monomer | THFA | 63.2 | 63.2 | 63.2 | 56.0 | 51.2 |
|  | IBXA | 24.0 | 24.0 | 24.0 | 24.0 | 24.0 |
| Polymerizable oligomer | CN959 |  |  |  |  | 4.8 |
| Polymerization initiator | Omnirad TPO | 7.9 | 7.9 | 7.9 | 7.9 | 7.9 |
| Polymerization inhibitor | BHT | 0.1 | 0.1 | 0.1 | 0.1 | 0.1 |
|  | Total (Percent by mass) | 100.0 | 100.0 | 100.0 | 100.0 | 100.0 |
| Evaluation result | Pencil hardness | HB | B | B | 5B | HB |
| Attachability | Glass slide | B | B | B | S | B |
|  | Stainless plate | A | A | A | A | C |
|  | Polypropylene film | C | C | C | A | A |
|  | Discharging stability | A | A | A | A | B |

TABLE 6

|  |  | Comparative Example 6 | Comparative Example 7 | Comparative Example 8 | Comparative Example 9 | Comparative Example 10 |
|---|---|---|---|---|---|---|
| All ophanate-bond-containing compound having activatable group at exposure to active energy ray | EBECRYL 4666 |  |  |  |  |  |
|  | EBECRYL 4738 |  |  |  |  |  |
|  | EBECRYL 4740 |  |  |  |  |  |
| Polyester resin having polymerizable unsaturated bond | UVAD-081 |  |  |  |  |  |
|  | UVAD-085 | 12.0 |  |  |  |  |
| Polyester resin not having polymerizable unsaturated bond | VYLON 802 |  | 12.0 |  |  |  |
|  | VYLON GK810 |  |  | 12.0 |  |  |
|  | VYLON 885 |  |  |  | 12.0 | 12.0 |
| Polymerizable monomer | THFA | 56.0 | 56.0 | 56.0 | 56.0 | 51.2 |
|  | IBXA | 24.0 | 24.0 | 24.0 | 24.0 | 24 |
| Polymerizable oligomer | CN959 |  |  |  |  | 4.8 |
| Polymerization initiator | Omnirad TPO | 7.9 | 7.9 | 7.9 | 7.9 | 7.9 |

TABLE 6-continued

|  |  | Comparative Example 6 | Comparative Example 7 | Comparative Example 8 | Comparative Example 9 | Comparative Example 10 |
|---|---|---|---|---|---|---|
| Polymerization inhibitor | BHT | 0.1 | 0.1 | 0.1 | 0.1 | 0.1 |
| Total (Percent by mass) | | 100.0 | 100.0 | 100.0 | 100.0 | 100.0 |
| Evaluation result | Pencil hardness | 5B | 5B | 4B | 4B | HB |
| | Attachability  Glass slide | S | C | B | B | C |
| | Stainless plate | A | C | C | C | C |
| | Polypropylene film | A | C | C | C | C |
| | Discharging stability | A | B | C | C | C |

The details of the individual materials shown in Tables 1 to 6 are as follows:
Polymerizable monomer (tetrahydrofurfuryl acrylate (THFA), VISCOAT® #150, manufactured by OSAKA ORGANIC CHEMICAL INDUSTRY LTD.)
Polymerizable monomer (isoboronyl acrylate (IBXA), manufactured by OSAKA ORGANIC CHEMICAL INDUSTRY LTD.)
Polymerizable oligomer (CN 959, manufactured by Sartomer Company)
Polymerization initiator (Omnirad TPO, manufactured by IGM Resins B.V.)
Polymerization inhibitor (BHT, manufactured by Tokyo Chemical Industry Co. Ltd.)
The allophanate-bond-containing compound having a group activatable at exposure to active energy rays are shown in Table 7.

TABLE 7

| | Trade name |
|---|---|
| Allophanate-bond-containing compound | EVERCRYL 4666 (manufactured by DAICEL-ALLNEX LTD.) |
| | EVERCRYL 4738 (manufactured by DAICEL-ALLNEX LTD.) |
| | EVERCRYL 4740 (manufactured by DAICEL-ALLNEX LTD.) |

Each of the three types of the above-mentioned allophanate compounds has an acryloyloxy group as the active energy ray active group.
The polyester resins are shown in Table 8.

TABLE 8

| | Trade name | Unsaturated bond | Number average molecular weight |
|---|---|---|---|
| Polyester resin | UVAD-081 (manufactured by OSAKA SODA CO., LTD ) | Yes | 1400 |
| | UVAD-085 (manufactured by OSAKA SODA CO., LTD.) | Yes | 2000 |
| | VYLON 802 (manufactured by TOYOBO CO., LTD.) | None | 3000 |
| | VYLON GK810 (manufactured by TOYOBO CO., LTD.) | None | 6000 |
| | VYLON 885 (manufactured by TOYOBO CO., LTD.) | None | 8000 |

The polymerizable unsaturated bond of UVAD-081 is an aryl group.
The polymerizable unsaturated bond of UVAD-085 is an aryl group.

The number average molecular weight of the polyester resins was measured according to gel permeation chromatography (GPC).

Discharging Stability in Inkjetting

Each active energy ray curable composition was placed in an inkjet discharging device (head: GENS, manufactured by Ricoh Co., Ltd.). The discharging state of the nozzles was observed with a camera after continuous discharging for 30 minutes to evaluate the discharging stability according to the following criteria. The results are shown in Table 9 to Table 14. Grade A represents acceptable for practical purpose.

Evaluation Criteria

A: All nozzles discharged
B: Less than 30 nozzles not discharged
C: 30 or more nozzles not discharged Application of Composition and Forming of Cured Film Film having a thickness of 10 μm was formed with a bar coater on a substrate (glass slide, stainless plate, or polypropylene film) using each active energy ray curable composition.
The film was cured with a metal halide lamp (4,000 mJ/cm$^2$, manufactured by USHIO INC.) to obtain cured film.

Substrate

Glass slide (S9213, thickness of from 1.2 to 1.5 mm, manufactured by Matsunami Glass Ind., Ltd.)
Stainless plate (Test piece. SUS304, thickness of 0.8 mm, manufactured by AS ONE Corporation.)
Polypropylene film (P2161, thickness of 60 μm, manufactured by TOYOBO CO., LTD.)
The strength and attachability of the cured film were evaluated in the following manner. The results are shown in Table 9 to Table 14.

Strength of Cured Film (Pencil Hardness)

The strength of cured film was evaluated on the basis of the pencil hardness test (JIS K5600-5-4 format, scratch hardness: pencil method) The hardness of pencil hardness is ascending from 6B, 5B, 4B, 3B, 2B, HB, FH, 2H, 3H, 4H, 5H, to 6H. HB or harder is preferable. 2B or above is acceptable for practical purpose.

Attachability

Attachability of cured film was evaluated in accordance with the evaluation method of the attachability test (cross cut method in JIS K5600-5-6 format) and the following criteria. The grade B and above are usable for practical purpose.

Evaluation Criteria

S: Not peeled at all
A: Peeled along the cut-in of a cutter but no cell peeled
B: less than 50 percent of the masses of the entire peeled
C: 50 percent or more of the masses of the entire peeled

TABLE 9

|  |  | Example 1 | Example 2 | Example 3 | Example 4 | Example 5 |
|---|---|---|---|---|---|---|
| Evaluation result | Discharging stability | A | A | A | A | A |
|  | Attachability  Glass slide | S | S | S | S | S |
|  | Stainless plate | S | A | A | A | B |
|  | Polypropylene film | A | A | A | A | A |
|  | Pencil hardness | HB | B | B | B | B |

TABLE 10

|  |  | Example 6 | Example 7 | Example 8 | Example 9 | Example 10 |
|---|---|---|---|---|---|---|
| Evaluation result | Discharging stability | A | A | A | A | A |
|  | Attachability  Glass slide | S | S | S | S | S |
|  | Stainless plate | B | A | B | B | A |
|  | Polypropylene film | A | A | A | A | A |
|  | Pencil hardness | B | F | HB | HB | F |

TABLE 11

|  |  | Example 11 | Example 12 | Example 13 | Example 14 | Example 15 |
|---|---|---|---|---|---|---|
| Evaluation result | Discharging stability | A | A | A | A | A |
|  | Attachability  Glass slide | S | S | S | S | S |
|  | Stainless plate | B | B | S | A | A |
|  | Polypropylene film | A | A | A | A | A |
|  | Pencil hardness | HB | HB | HB | B | B |

TABLE 12

|  |  | Example 16 | Example 17 | Example 18 | Example 19 |
|---|---|---|---|---|---|
| Evaluation result | Discharging stability | A | B | A | A |
|  | Attachability  Glass slide | A | S | A | S |
|  | Stainless plate | A | S | A | S |
|  | Polypropylene film | A | A | A | A |
|  | Pencil hardness | B | HB | HB | HB |

TABLE 13

|  |  | Comparative Example 1 | Comparative Example 2 | Comparative Example 3 | Comparative Example 4 | Comparative Example 5 |
|---|---|---|---|---|---|---|
| Evaluation result | Discharging stability | A | A | A | A | B |
|  | Attachability  Glass slide | B | B | B | S | B |
|  | Stainless plate | A | A | A | A | C |
|  | Polypropylene film | C | C | C | A | A |
|  | Pencil hardness | HB | B | B | 5B | HB |

TABLE 14

|  |  | Comparative Example 6 | Comparative Example 7 | Comparative Example 8 | Comparative Example 9 | Comparative Example 10 |
|---|---|---|---|---|---|---|
| Evaluation result | Discharging stability | A | B | C | C | C |
|  | Attachability  Glass slide | S | C | B | B | C |
|  | Stainless plate | A | C | C | C | C |
|  | Polypropylene film | A | C | C | C | C |
|  | Pencil hardness | 5B | 5B | 4B | 4B | HB |

As seen in the results shown in Tables 9 to 14, Examples 1 to 19 are better in the balance between the attachability and the strength of film than Comparative Examples 1 to 10 and demonstrates excellent discharging stability in inkjetting.

Aspects of the present disclosure are, for example, as follows.

1. An active energy ray curable composition contains an allophanate-bond-containing compound having an activatable group at exposure to active energy rays and a polyester resin having a polymerizable unsaturated bond.

2. The active energy ray curable composition according to 1 mentioned above, wherein the polymerizable unsaturated bond is not derived from a (meth)acryloyl group.

3. The active energy ray curable composition according to 1 or 2 mentioned above, wherein the polyester resin has a number average molecular weight of 3,000 or less.

4. The active energy ray curable composition according to any one of 1 to 3 mentioned above, wherein the proportion of the allophanate-bond-containing compound is from 4 to 10 percent by mass.

5. The active energy ray curable composition according to any one of 1 to 4 mentioned above, wherein the proportion of the polyester resin is from 5 to 20 percent by mass.

6. An active energy ray curable ink composition contains the active energy ray curable composition of any one of 1 to 5 mentioned above.

7. An active energy ray curable inkjet ink composition contains the active energy ray curable ink composition of 6 mentioned above.

8. A composition container includes a container containing one of the active energy ray curable composition of any one of 1 to 5 mentioned above, the active energy ray curable ink composition of 6 mentioned above, and the active energy ray curable inkjet ink composition of 7 mentioned above.

9. An image forming device for two or three dimensional images include an accommodating unit containing one of the active energy ray curable composition of any one of 1 to 5 mentioned above, the active energy ray curable ink composition of 6 mentioned above, and the active energy ray curable inkjet ink composition of 7 mentioned above and an irradiator to emit active energy rays.

10. An image forming method for forming two or three dimensional images includes exposing one of the active energy ray curable composition of any one of 1 to 5 mentioned above, the active energy ray curable ink composition of 6 mentioned above, and the active energy ray curable inkjet ink composition of 7 mentioned above to active energy rays.

11. Cured matter cured by exposing one of the active energy ray curable composition of any one of 1 to 5 mentioned above, the active energy ray curable ink composition of 6 mentioned above, and the active energy ray curable inkjet ink composition of 7 mentioned above to active energy rays.

12. Decorated matter includes a substrate and a surface decoration formed of the cured matter of 1 mentioned above.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An active energy ray curable ink composition, comprising:
the active energy ray curable composition which comprises
an allophanate-bond-containing compound having an activatable group at exposure to active energy rays; and
a polyester resin having a polymerizable unsaturated bond;
wherein the polyester resin has a number average molecular weight of 3,000 or less.

2. An active energy ray curable inkjet ink composition, comprising:
the active energy ray curable ink composition of claim 1.

3. A composition container, comprising:
a container containing the active energy ray curable ink composition of claim 1.

4. An image forming device, comprising:
an accommodating unit containing the active energy ray curable ink composition of claim 1; and
an irradiator configured to emit active energy rays.

5. An image forming method, comprising:
exposing the active energy ray curable ink composition of claim 1 to active energy rays.

6. Cured matter obtained by exposing the active energy ray curable ink composition of claim 1 to active energy rays.

7. Decorated matter, comprising:
a substrate; and
a surface decoration formed of the cured matter of claim 6.

8. The active energy ray curable ink composition according to claim 1, wherein the polymerizable unsaturated bond is not derived from a (meth)acryloyl group.

9. The active energy ray curable ink composition according to claim 1, wherein a proportion of the allophanate-bond-containing compound is from 4 to 10 percent by mass based on a total weight of said active energy ray curable ink composition.

10. The active energy ray curable ink composition according to claim 1, wherein a proportion of the polyester resin is from 5 to 20 percent by mass based on a total weight of said active energy ray curable ink composition.

\* \* \* \* \*